(12) United States Patent
Onda et al.

(10) Patent No.: US 10,587,171 B2
(45) Date of Patent: Mar. 10, 2020

(54) MANUFACTURING METHOD FOR ROTATING ELECTRIC MACHINE

(71) Applicant: HONDA MOTOR CO., LTD., Tokyo (JP)

(72) Inventors: Hideaki Onda, Tochigi (JP); Yosuke Honda, Tochigi (JP); Yasuyuki Kimura, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 282 days.

(21) Appl. No.: 14/468,647

(22) Filed: Aug. 26, 2014

(65) Prior Publication Data

US 2015/0059164 A1    Mar. 5, 2015

(30) Foreign Application Priority Data

Aug. 29, 2013 (JP) .................... 2013-177976

(51) Int. Cl.
   *H02K 15/00* (2006.01)

(52) U.S. Cl.
   CPC .... *H02K 15/0087* (2013.01); *Y10T 29/49009* (2015.01)

(58) Field of Classification Search
   CPC .. H02K 15/0087; H02K 15/085; H02K 15/08; Y10T 29/49009
   USPC .................... 29/596, 592.1, 592; 219/121.64
   See application file for complete search history.

(56) References Cited

U.S. PATENT DOCUMENTS

| | | | |
|---|---|---|---|
| 2004/0172805 A1 | 9/2004 | Tokizawa | |
| 2010/0170317 A1* | 7/2010 | Saito | B21D 7/02 72/298 |
| 2011/0198953 A1* | 8/2011 | Shinohara | H02K 3/12 310/71 |
| 2012/0200190 A1* | 8/2012 | Matsuoka | H02K 3/12 310/179 |
| 2012/0319523 A1* | 12/2012 | Manabu | H02K 15/0464 310/201 |

FOREIGN PATENT DOCUMENTS

| | | |
|---|---|---|
| EP | 1117172 A2 | 7/2001 |
| EP | 1128530 A2 | 8/2001 |

(Continued)

OTHER PUBLICATIONS

Wikipedia—Euler-Bernoulli beam theory—Jun. 17, 2005 and Timoshenko, S., (1953), History of strength of materials, McGraw-Hill New York.*

(Continued)

*Primary Examiner* — Peter Dungba Vo
*Assistant Examiner* — Azm A Parvez
(74) *Attorney, Agent, or Firm* — Rankin, Hill & Clark LLP (57) ABSTRACT

A manufacturing method for a rotating electric machine, in which the distal end portions of a plurality of coil ends, which are projected from slots of a stator core of a rotating electric machine and which are arranged in the radial direction of the stator core to form a plurality of layers, are held, and the coil ends are twisted and bent while moving the distal end portions in the circumferential direction. Neutral lines for bending the coil ends are different for each layer, and the neutral lines for the bending are positioned on farther outer sides for coil ends of farther outer layers.

4 Claims, 8 Drawing Sheets

(56) References Cited

FOREIGN PATENT DOCUMENTS

| | | |
|---|---|---|
| EP | 1416610 A1 | 5/2004 |
| JP | 2001-197709 | 7/2001 |
| JP | WO 2013042478 A1 * | 3/2013 ......... H02K 15/0435 |
| WO | WO-2013042478 A1 * | 3/2013 ......... H02K 15/0435 |

OTHER PUBLICATIONS

European Search Report dated Feb. 18, 2015, 6 pages.

* cited by examiner

MANUFACTURING METHOD FOR ROTATING ELECTRIC MACHINE

BACKGROUND OF THE INVENTION

Field of the Invention

The present invention relates to a manufacturing method of a rotating electric machine and more particularly to a manufacturing method of a rotating electric machine whereby to manufacture the rotating electric machine by twisting and bending the end portions of conductors.

Description of the Related Art

Hitherto, there has been proposed an apparatus that twists and bends the end portions of conductors (coil segments) projecting from slots formed to be arranged in the circumferential direction of a stator core. For example, Japanese Patent Application Laid-Open No. 2001-197709 (hereinafter referred to as Patent Document 1) describes a method wherein, in a state in which a plurality of conductors project from the slots of a stator core and arranged in the radial direction of the stator core such that the conductors form a plurality of layers, the end portion of each conductor are held and the conductors are twisted and bent while moving the end portions in the circumferential direction. In the method, annular jigs (guides) corresponding to the conductors of respective layers are used.

Whenever the conductor end portions are moved in the circumferential direction, the conductor end portions inevitably shift also in an axial direction. Therefore, in order to twist and bend the conductors, it is necessary to shift the conductor end portions in the circumferential direction and the axial direction. According to the method described in the foregoing Patent Document 1, the annular jig that sandwiches both side surfaces of the conductor end portions of each layer to hold the conductor end portions is rotated in the circumferential direction and at the same time, the annular jig is moved also in the axial direction independently for each layer according to the movement distance of the conductor end portions in the axial direction.

To improve the performance, including the magnetic flux density, of the rotating electric machine, the twisted and bent conductor end portions of the layers preferably have the same height. However, if the conductor end portions are moved in the circumferential direction by the same angle, then the conductors on a radially outer side and the conductors on a radially inner side will have different movement distances in the circumferential direction, inevitably causing the conductor end portions to have different movement distances also in the axial direction. Hence, according to, for example, the method described in the foregoing Patent Document 1, the projecting lengths of the conductor end portions before being twisted and bent are set to be longer for the layers in farther radially outer side, and radially outer jigs and radially inner jigs are rotated in the circumferential direction by the same angle.

To change the projecting lengths of the conductor end portions before being twisted and bent for each layer as described above, it is required to prepare a plurality of types of conductors having different lengths as the materials and to arrange the conductors for each layer in order and dispose the conductors in slots. This poses a problem in that the preparatory process for twisting and bending the conductors becomes complicated, resulting in deteriorated production efficiency.

SUMMARY OF THE INVENTION

In view of the aspects described above, an object of the present invention is to provide a manufacturing method of a rotating electric machine that allows the projecting heights of the conductor end portions of each layer to become equal after being twisted and bent, without complicating a preparatory process for twisting and bending the conductors.

To this end, the present invention provides a manufacturing method of a rotating electric machine, including: a step of holding end portions of a plurality of conductors, which are projected from slots of a stator core of a rotating electric machine and which are arranged in a radial direction of the stator core to form a plurality of layers, and twisting and bending the conductors while moving the end portions in a circumferential direction, wherein a neutral line for bending the conductors is different for each layer.

According to the present invention, the neutral line for bending the conductors is different for each layer. Hence, when the end portions of the conductors of each layer are moved by the same angle in the circumferential direction at the time of twisting and bending the conductors, the movement distance of the end portions of the conductors of each layer in an axial direction can be adjusted.

When the conductors are twisted and bent at the neutral lines for the bending, the conductors of farther outer layers will have longer projecting end portions after the conductors are twisted and bent.

In the present invention, therefore, the neutral lines for the bending are preferably positioned on farther outer sides for conductors of farther outer layers. This makes it possible to restrain the projecting heights of the end portions of the conductors on the outer side from decreasing when the end portions of the conductors of the layers are moved by the same angle in the circumferential direction at the time of twisting and bending the conductors.

Thus, even if the projecting heights of the end portions of the conductors of each of the layers before the twisting and bending are approximately the same, it is possible for the projecting heights of the end portions of the conductors of each of the layers to become approximately the same after the conductor end portions are twisted and bent. This makes it possible, therefore, to obtain approximately the same projecting heights of the twisted and bent end portions of the conductors of the layers without complicating the preparatory process for twisting and bending the conductors.

Further, in the present invention, the projecting heights of the end portions of the conductors of each of the layers after the twisting and bending are preferably the same.

Further, the projecting heights of the end portions of the conductors of each of the layers before the twisting and bending are preferably the same.

In these cases, even if the projecting heights of the end portions of the conductors of each of the layers before the twisting and bending are the same, it is possible for the projecting heights of the end portions of the conductors of each of the layers to become equal after the twisting and bending. Therefore, the same projecting heights of the twisted and bent end portions of the conductors of each of the layers can be obtained without complicating the preparatory process for twisting and bending the conductors. Further, the same projecting heights of the twisted and bent end portions of the conductors of each of the layers lead to improved performance, such as a magnetic flux density, of a rotating electric machine.

BRIEF DESCRIPTION OF THE DRAWINGS

FIG. 9A and FIG. 9B are diagrams illustrating coil ends before and after the coil ends are twisted and bent, wherein FIG. 9A illustrates a coil end positioned in an outer layer, while FIG. 9B illustrates a coil end positioned in an inner layer.

DESCRIPTION OF THE PREFERRED EMBODIMENTS

Figure 1:
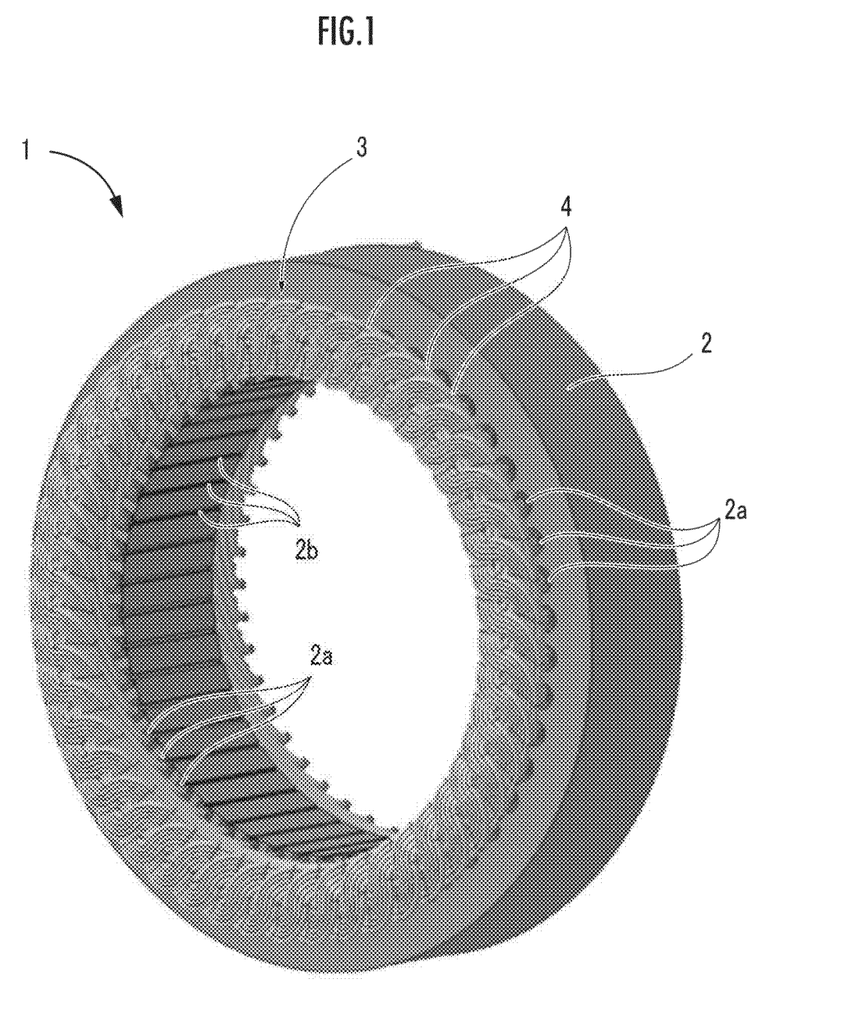
FIG. 1 is a perspective view illustrating an example of a stator of a rotating electric machine manufactured by using a manufacturing method according to the present invention.
Figure 2:
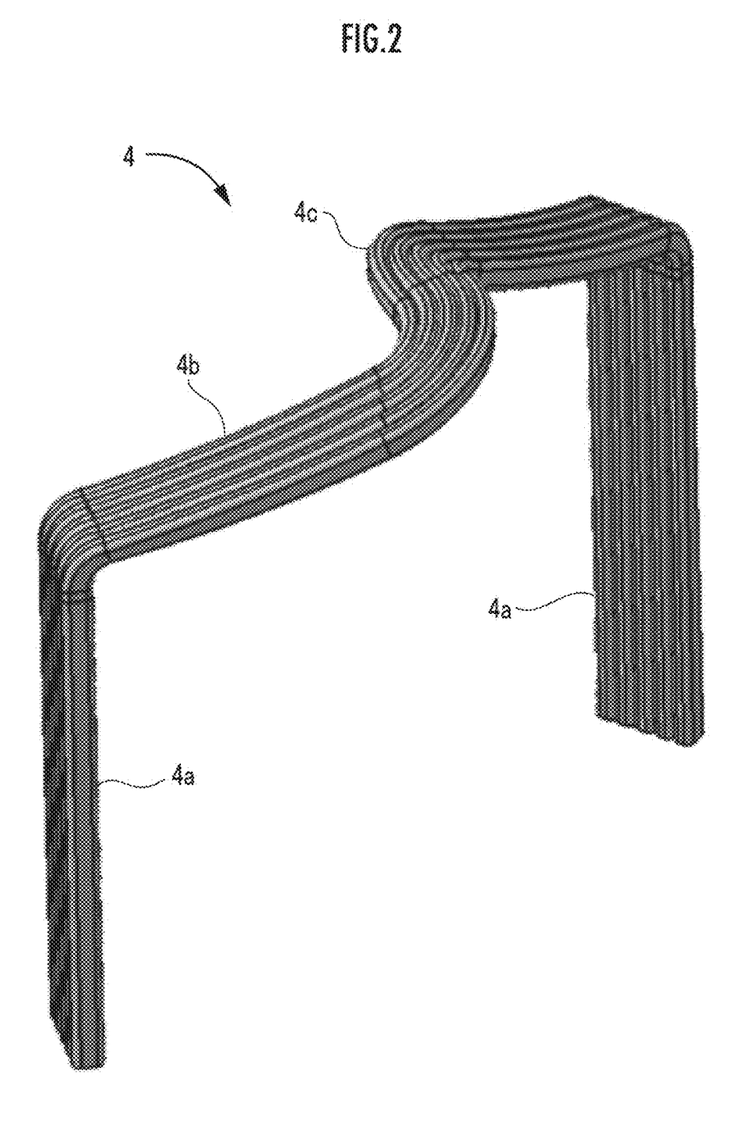
FIG. 2 is a perspective view illustrating a coil segment.
Figure 3:
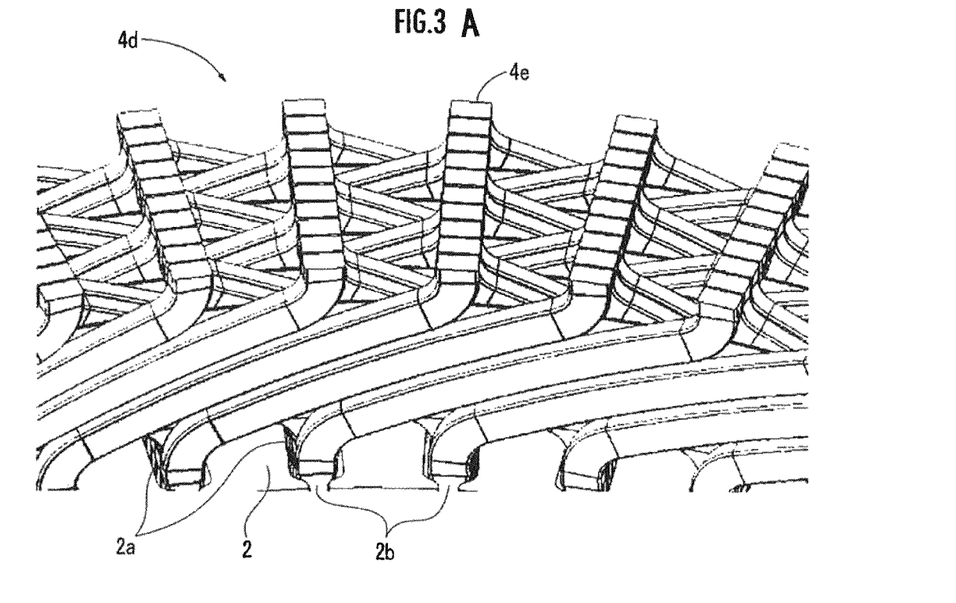
FIG. 3A is a perspective view illustrating projecting portions of the coil segments.
FIG. 3B is a perspective view illustrating the projecting portion of only one phase.

Referring first to FIG. 1 to FIG. 3, an example of the construction of a rotating electric machine fabricated by using the manufacturing method for a rotating electric machine according to the present invention will be described.

A rotating electric machine, such as an electric motor or an electric generator, is constituted of a stator 1 having a cylindrical shape and a rotor (not illustrated) rotatably disposed on the inner side of the stator 1.

The stator 1 is constituted of a stator core 2 and a coil 3. The stator core 2 has a cylindrical shape and a plurality of slots 2a, which penetrate in the direction of a rotational axis and which are provided in a circumferential direction with intervals thereamong. The slots 2a are formed such that the shapes of the cross sections thereof in the radial direction of the stator core 2 radially elongate from the center side of the stator core 2 in the radial direction, and are in communication with the inner peripheral surface of the stator core 2 through slits 2b formed in the stator core 2. The slits 2b may not be provided.

A coil 3 is formed by inserting coil segments 4, one of which is illustrated in FIG. 2, into the slots 2a from one side and by twisting and bending in the circumferential direction the projecting portions thereof that project from the other side of the slots 2a and then joining the projecting portions. Each of the coil segments 4 is formed by bundling a plurality of (four in the present embodiment) conductors having rectangular cross sections (rectangular conducting wires) by arranging the conductors side by side such that wide surfaces thereof oppose each other and then forming the bundle into a U shape. The coil segment 4 is comprised of a pair of legs 4a, 4a and a head 4b that connects one ends (the upper ends in the drawing) of the two legs 4a, 4a.

The coil segment 4 may be alternatively formed of, for example, a plurality of rectangular wires bundled side by side such that the narrow surfaces thereof oppose each other, as long as a plurality of rectangular wires are bundled in the width direction.

At the center of the head 4b, an S-shaped portion 4c, which curves in an S shape in the lengthwise direction of the rectangular wires, is formed. Further, the head 4b slopes downward from the center thereof (the center of the S-shaped portion 4c) toward the two legs 4a, 4a. The leg 4a of the coil segment 4 is inserted into the corresponding slot 2a from one side thereof. The leg 4a of the coil segment 4 projects from the other side of the slot 2a.

A projecting portion 4d of the leg 4a, which projects from the other side of the slot 2a is twisted and bent in the circumferential direction of the stator 1, as illustrated in FIG. 3A, and distal end portions 4e of matching projecting portions 4d are joined by TIG welding or the like. The coil 3 in the present embodiment is a three-phase coil consisting of a U-phase, a V-phase, and a W-phase. The legs 4a of the coil segments 4 inserted into each of the slots 2a are arranged in the order of the U-phase, the U-phase, the V-phase, the V-phase, the W-phase and the W-phase in the circumferential direction. FIG. 3B illustrates only the coil for one phase (e.g., the U-phase coil) of the three phases.

The method for manufacturing the coil segment 4 will now be described.

First, a plurality of (four in the present embodiment) rectangular wires are arranged into one rectangular wire bundle such that the wide surfaces thereof oppose each other. Then, the central portion of the rectangular wire bundle is curved into an S shape to form the S-shaped portion 4c. Next, the rectangular wire bundle has to be bent along the circumferential direction of the stator core 2, because the slots 2a are disposed in the circumferential direction with intervals provided thereamong.

Then, the rectangular wire bundle is curved such that it slopes downward from the center thereof, namely, the center of the S-shaped portion 4c. Subsequently, both end portions of the rectangular wire bundle are bent downward to form the legs 4a, 4a. Thus, the coil segment 4 illustrated in FIG. 2 is formed.

Figure 4:
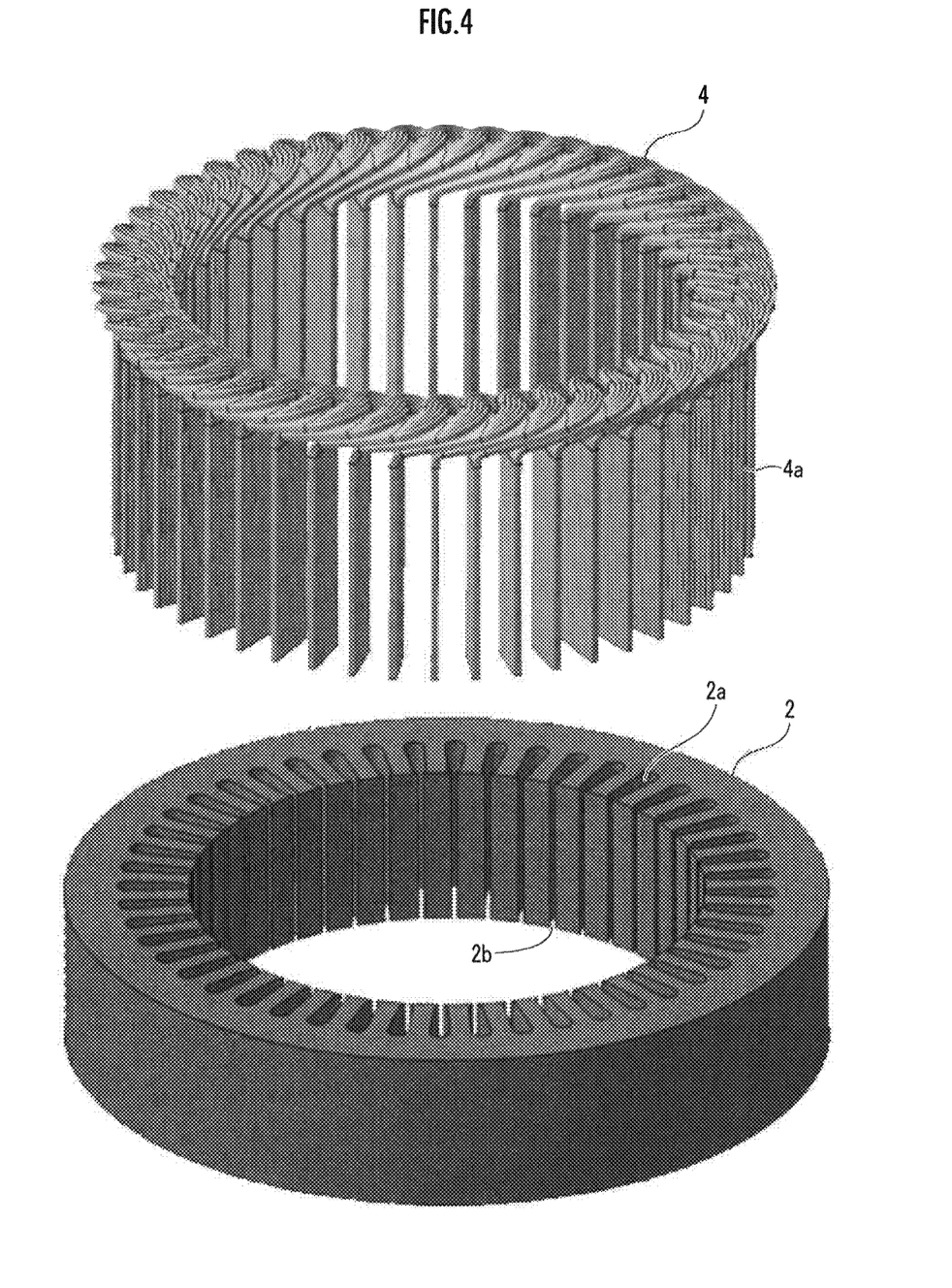
FIG. 4 is a perspective view illustrating the coil segments arranged in a circumferential direction.

The coil segments 4 formed as described above are arranged in the circumferential direction to match the positions of the slots 2a (refer to FIG. 3A), partly overlapping, and the legs 4a are inserted into the slots 2a of the stator core 2. The legs 4a are designed to project downward from the slots 2a by a preset length.

The projecting portions 4d, which are straight portions of the legs 4a projecting from the lower side of the slots 2a are twisted and bent in the circumferential direction by using a twisting and bending device 10. The distal end portion 4e, which is a straight portion of the projecting portion 4d, which has been twisted and bent, is joined to the adjacent distal end portion 4e by TIG welding or the like. Thus, eight layers (eight pieces) of coil segments 4 are laminated in the radial direction to complete the stator 1. In this case, the layers are arranged in order, beginning with the first layer, the second layer, . . . , the eighth layer, from the radially outer side to the radially inner side.

The lengths of the linear projecting portions 4d after the twisting and bending are the same in the layers. The term "the same" in this case does not have to be exactly the same. More specifically, the lengths may be different to an extent that does not adversely affect the performance, such as the magnetic flux density and the like of the rotating electric machine, and the difference in length may be, for example, 0.1 mm or less, or 0.3 mm or less.

The following will describe the twisting and bending device 10 with reference to FIG. 5 to FIG. 9.

Figure 5:
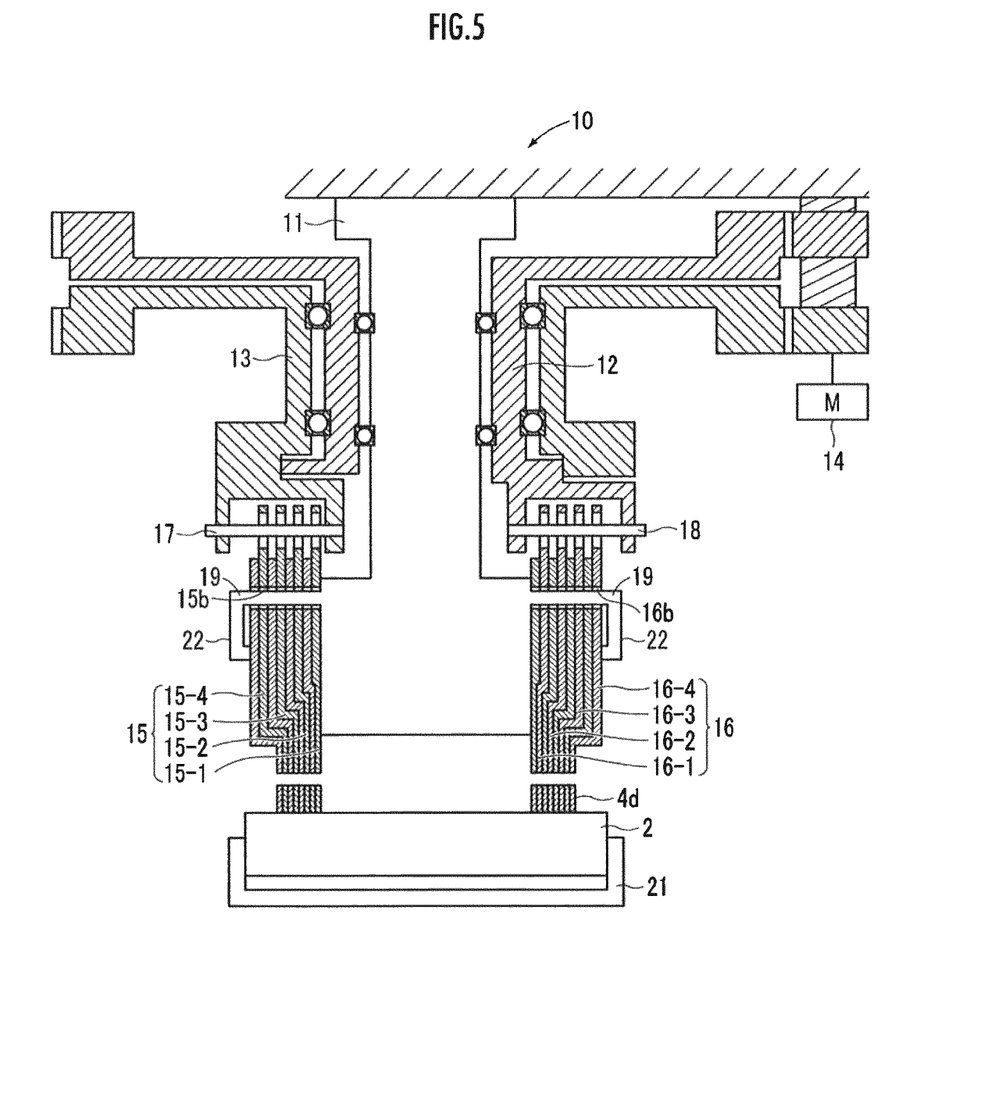
FIG. 5 is a schematic sectional view illustrating a twisting and bending device according to an embodiment.

The twisting and bending device 10 is a device that twists and bends the projecting portions (hereinafter referred to as "the coil ends") 4d of the coil segments 4 which project from the slots 2a.

The lengths of the linear projecting portions before the twisting and bending, namely, the coil ends 4d, are the same in every layer. The term "the same" in this case does not have to be exactly the same. More specifically, the lengths may be different to a certain extent, e.g. 0.1 mm or less, or 0.3 mm or less.

The twisting and bending device 10 includes a support member 11, two rotators 12, 13, a rotational driver 14, holding jigs 15-1 to 15-4 and 16-1 to 16-4 corresponding to the coil ends 4d of the individual layers (hereinafter representatively referred to "the holding jigs 15 and 16"), two connecting rods 17, 18 and fixing rods 19, and a stator core holder 21.

The support member 11 has the upper end portion thereof fixed to a ceiling or the like.

The two rotators 12, 13 are adapted to be rotatable relative to the support member 11. The rotators 12, 13 are provided such that the inner rotator 12 is rotatable relative to the support member 11 through a bearing and the outer rotator 13 is rotatable relative to the inner rotator 12 through a bearing.

The rotational driver 14 rotates the inner rotator 12 and the outer rotator 13 in circumferential directions that are opposite from each other. In this case, the rotational driver 14 rotates the inner rotator 12 clockwise and the outer rotator 13 counterclockwise. The rotational driver 14 is an electric motor and rotates the inner rotator 12 and the outer rotator 13 through the intermediary of a train of gears.

The holding jig 15 consists of four odd-numbered layer holding jigs 15-1 to 15-4 corresponding to the coil ends 4d of a plurality of odd-numbered layers, namely, the first layer, the third layer, the fifth layer and the seventh layer, while the holding jig 16 consists of four even-numbered layer holding jigs 16-1 to 16-4 corresponding to the coil ends 4d of a plurality of even-numbered layers, namely, the second layer, the fourth layer, the sixth layer and the eighth layer. The holding jigs 15 and 16 both have cylindrical shapes with steps and are concentrically arranged in the order of the layers.

The connecting rod 17 for the odd-numbered layers is fixed to the outer rotator 13 and connects the four odd-numbered layer holding jigs 15-1 to 15-4. More specifically, the distal end portions extended from the upper portions of the odd-numbered layer holding jigs 15-1 to 15-4 have elliptical through holes, which use the axial direction of the outer rotator 13 as the longitudinal direction thereof, and the single odd-numbered layer connecting rod 17 passes through all the through holes. Thus, as the outer rotator 13 rotates, the four odd-numbered layer holding jigs 15-1 to 15-4 become independently movable in the axial direction and also rotate by the same angle at the same time.

The distal end portions of the odd-numbered layer holding jigs 15-1 to 15-4, where the through holes are formed, are positioned above the distal ends of the adjacent even-numbered layer holding jigs 16-1 to 16-4, and the odd-numbered layer connecting rod 17 does not interfere with the even-numbered layer holding jigs 16-1 to 16-4.

The even-numbered layer connecting rod 18 is fixed to the inner rotator 12 and connects the four even-numbered layer holding jigs 16-1 to 16-4. As with the odd-numbered layer connecting rod 17, the even-numbered layer connecting rod 18 passes through the elliptical through holes formed in the upper end portions of the even-numbered layer holding jigs 16-1 to 16-4. Thus, as the inner rotator 12 rotates, the four even-numbered layer holding jigs 16-1 to 16-4 become independently movable in the vertical direction and also rotate by the same angle at the same time.

The distal end portions of the even-numbered layer holding jigs 16-1 to 16-4, where the through holes are formed, are positioned above the distal ends of the adjacent odd-numbered layer holding jigs 15-1 to 15-4, and the even-numbered layer connecting rod 18 does not interfere with the odd-numbered layer holding jigs 15-1 to 15-4. The holding jigs 15 and 16 may have elliptical cutouts with open upper ends, which use the axial direction as the longitudinal direction thereof, in place of the elliptical through holes.

Figure 6:
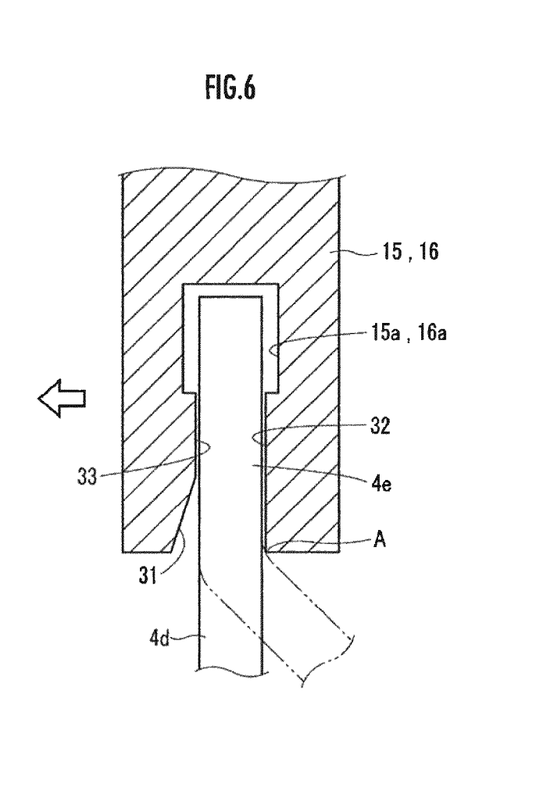
FIG. 6 is an enlarged sectional view illustrating a holder.

As illustrated in FIG. 6, the lower end surfaces of the holding jigs 15 and 16 have holders 15a and 16a, respectively, into which the distal end portions 4e of the coil ends 4d are inserted to be retained. The same number of holders 15a and 16a as that of the slots 2a is provided such that the holders 15a and 16a are arranged in the circumferential direction.

The lower end surfaces of the holding jigs 15 and 16 are positioned so as to be flush to match the length of the coil ends 4d. Thus, the distal end portions 4e of the coil ends 4d inserted into the holders 15a and 16a have the same projecting length.

The holders 15a and 16a have rectangular cross sections to match the rectangular cross sections of the coil segments 4.

However, the inlet portions of the holders 15a and 16a on the side of the direction in which the holding jigs 15 and 16 advance have tapered portions 31. The tapered portions 31 enlarge the inlet portions of the holders 15a and 16a, permitting easy entry of the distal end portions 4e of the coil ends 4d.

Meanwhile, the inlet portions of the holders 15a and 16a on the side opposite from the side of the direction in which the holding jigs 15 and 16 advance have surfaces 32, which are parallel to the axial direction, i.e. vertical. Thus, the angular portions on the lower end side of the surfaces 32 of the inlet portions of the holders 15a and 16a abut against the inner bent portions of the coil ends 4d after being bent, i.e. the inner angular portions of the distal end portions 4e, creating an engaged state. This increases the gripping forces of the holding jigs 15 and 16 to grip the coil ends 4d.

Further, the cross sections of the holders 15a and 16a enlarge toward their back ends. Hence, the back ends of the middle portions of the holders 15a and 16a provide the support points of a reaction force, thus preventing the coil ends 4d inserted in the holders 15a and 16a from jumping out and also increasing the gripping forces of the holding jigs 15 and 16 to grip the coil ends 4d.

As described above, the gripping forces of the holding jigs 15 and 16 to grip the coil ends 4d are high, allowing the holding jigs 15 and 16 to apply a tensile force or compression force to the coil ends 4d.

The tapered portion 31 illustrated in FIG. 6 is straight, but may alternatively be curved. Further, vertical surfaces may be present at the inlet portions of the holders 15a and 16a on the side of the direction in which the holding jigs 15 and 16 advance and the tapered portions may be provided inside beyond the vertical surfaces.

Figure 7:
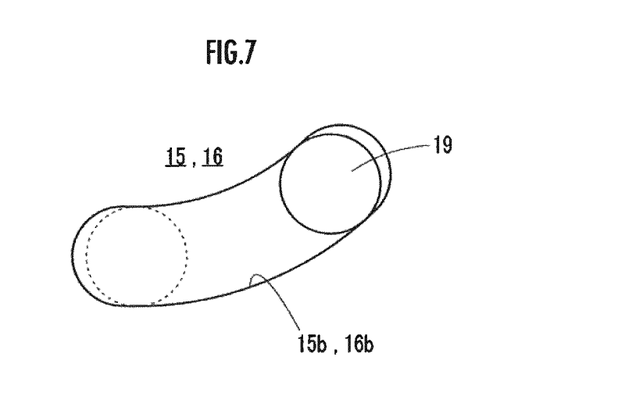
FIG. 7 is an enlarged view illustrating the shape of a through hole.

The holding jigs 15 and 16 also have through holes 15b and 16b, which are formed in the outer peripheral surfaces thereof and which have different shapes, as illustrated in FIG. 7. In the circumferential direction, the through holes 15b and 16b gradually extend in the axial direction. Further, the fixing rods 19 made of round rods, which penetrate the through holes 15b and 16b, are fixed to the support member 11.

The profiles of the through holes 15b and 16b to be formed in the holding jigs 15 and 16, respectively, are determined according to the shapes of the coil ends 4d to be twisted and bent by the holding jigs 15 and 16.

Figure 8:
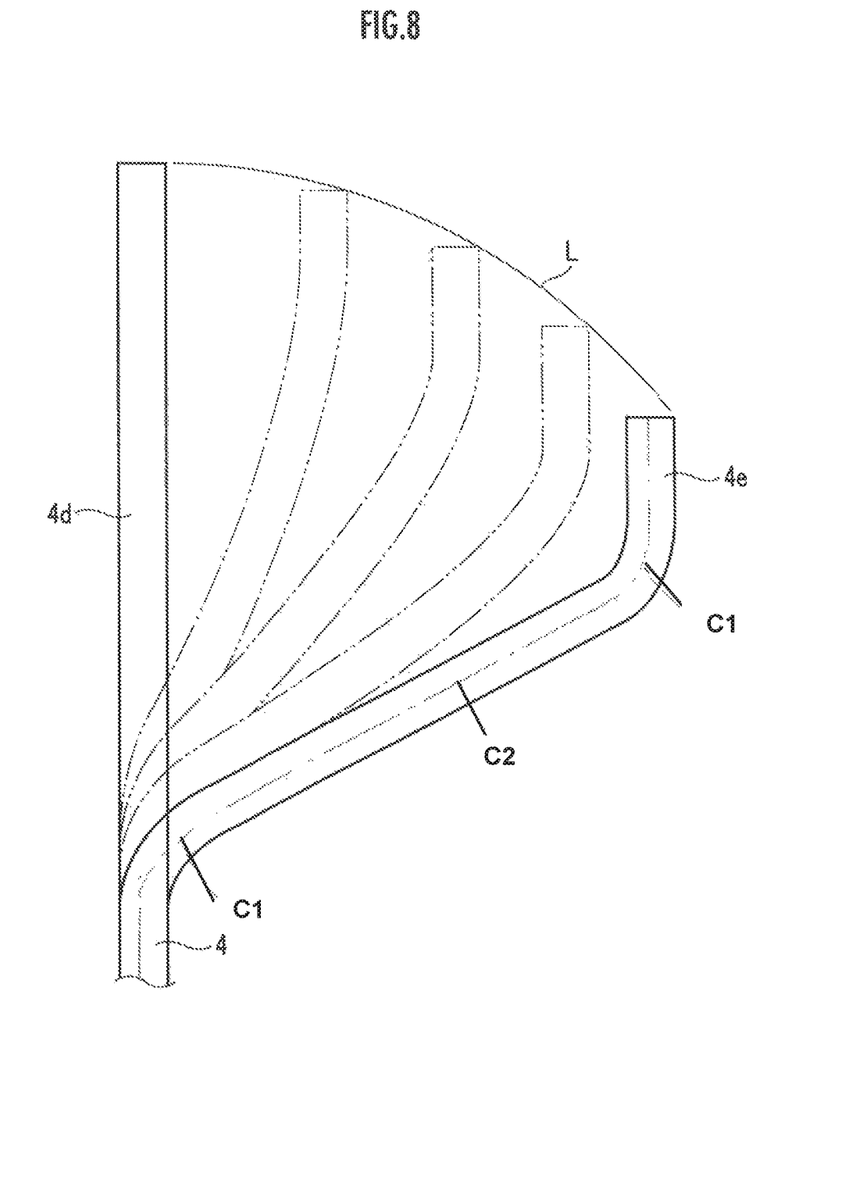
FIG. 8 is a diagram illustrating the process of drawing the profile of the through hole.

More specifically, as illustrated in FIG. 8, for example, the coil end 4*d* before the twisting and bending (linear), in the middle of the twisting and bending, and after the twisting and bending, respectively, are drawn along the twisting and bending process such that the bend neutral line C1 (neutral plane) of the twisting and bending provides the central line C2 (central plane) in the width direction of the coil end 4*d*, thereby determining a movement locus L of the distal end portion 4*e* of the coil end 4*d*.

Figure 9A:
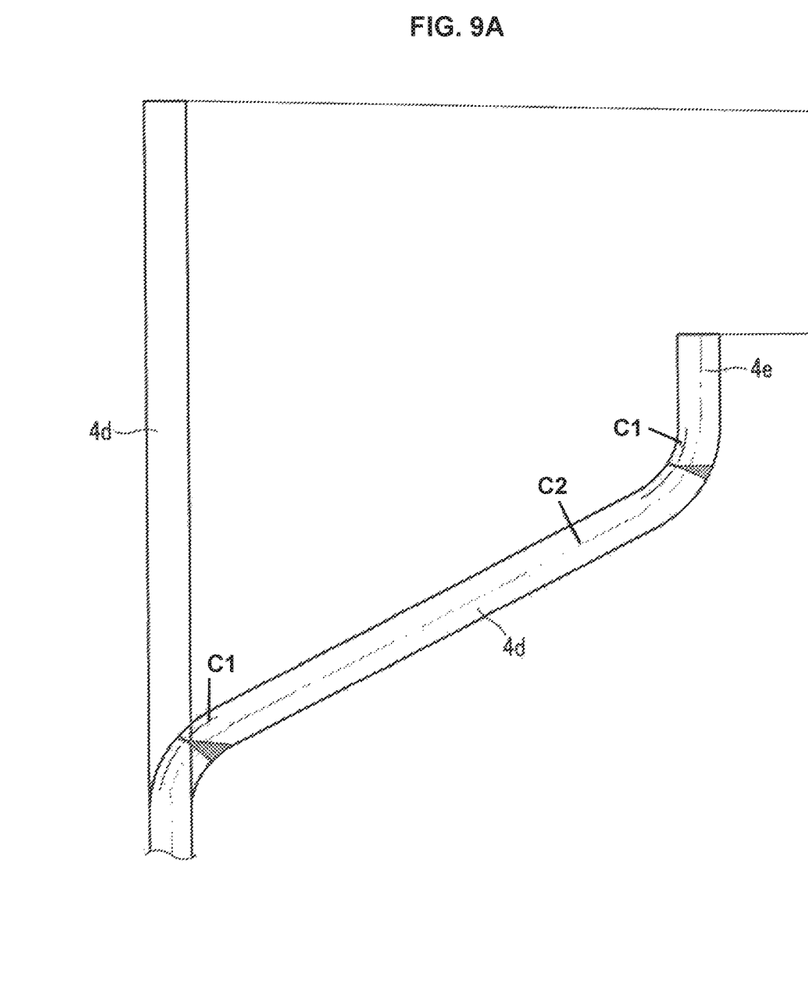

Then, referring to FIG. 9A, if the coil end 4*d* is one positioned in an outer layer, then the movement locus L determined as described above is corrected such that the neutral line C1 of the twisting and bending will be positioned on the outer side relative to the central line C2 in the width direction of the coil end 4*d*. The correction is made such that the neutral line C1 of the twisting and bending will be positioned farther on the outer side for the coil end 4*d* positioned in a farther outer layer.

Subsequently, referring to FIG. 7, the contours of the fixing rod 19 when moved are drawn to determine the contours of the through holes 15*b* and 16*b* such that the coil end 4*d* is twisted and bent along the corrected neutral line C1 of the twisting and bending. More specifically, the contours of the through holes 15*b* and 16*b* are determined such that, when twisting and bending the coil end 4*d*, the coil end 4*d* is twisted and bent by tensile bending, in which the holding jigs 15 and 16 apply a tensile force to the distal end portion 4*e* of the coil end 4*d*.

Figure 9B:
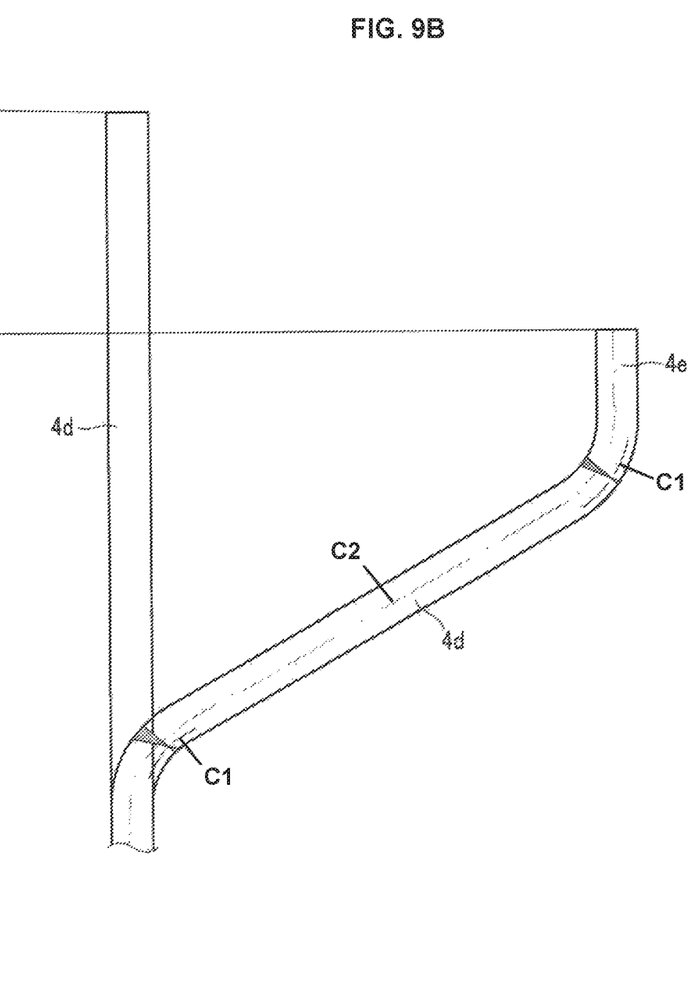

Meanwhile, referring to FIG. 9B, if the coil end 4*d* is one positioned in an inner layer, then the movement locus L is corrected such that the neutral line C1 of the twisting and bending is positioned on the inner side relative to the central line C2 in the width direction of the coil end 4*d*. The correction is made such that the neutral line C1 of the twisting and bending will be positioned farther on the inner side for the coil end 4*d* positioned in a farther inner layer. If the coil end 4*d* is one positioned in an intermediate layer, then there is no need to correct the neutral line C1 of the twisting and bending.

Then, referring to FIG. 7, the contours of the fixing rods 19 when moved are drawn to determine the contours of the through holes 15*b* and 16*b* such that the coil end 4*d* is twisted and bent along the corrected neutral line C1 of the twisting and bending. More specifically, the contours of the through holes 15*b* and 16*b* are determined such that, when twisting and bending the coil end 4*d*, the coil end 4*d* is twisted and bent by compressive bending, in which the holding jigs 15 and 16 apply a compression force to the distal end portion 4*e* of the coil end 4*d*.

Further, the contours of the through holes 15*b* and 16*b* are preferably determined by referring to FIG. 9A and FIG. 9B such that the projecting heights of the distal end portions 4*e* of the coil ends 4*d* of the layers after the twisting and bending will be the same. This will improve the performance, such as the magnetic flux density, of the rotating electric machine.

Whether the tensile bending or the compressive bending is used, only a slight difference will result in the height of the distal end portion 4*e* of the coil end 4*d*. However, if, for example, the width of the coil end 4*d* is approximately 2 mm, the total of differences in the height of the coil ends 4*d* in each of the layers is approximately 4 mm, and the outside diameter of the stator core 2 is approximately 300 mm, then the difference in the height of the coil ends 4*d* in each of the layers can be accommodated.

The rotation of the rotators 12 and 13 causes the holding jigs 15 and 16, respectively, to move down according to the profiles of the through holes 15*b* and 16*b* as the inner surfaces of the through holes 15*b* and 16*b* slide against the fixing rods 19.

The inner peripheral surface of the innermost holding jig 15-1 is restricted in its radial inward movement by the outer peripheral surface of the support member 11. Thus, the outer peripheral surface of the support member 11 functions as the guide for guiding the inner sides of the holding jigs 15 and 16.

Further, the outer peripheral surface of the outermost holding jig 16-4 is restricted in its radial outward movement by the inner peripheral surface of an annular guide 22 secured to the support member 11 and the fixing rod 19. Thus, the guide 22 functions as the guide for guiding the outer sides of the holding jigs 15 and 16.

The stator core holder 21 holds the stator core 2 having the legs 4*a* of the coil segments 4 inserted in the slots 2*a*. Further, the stator core holder 21 is constructed to be vertically movable relative to the support member 11 by a lifting unit (not illustrated).

The following will describe the method for twisting and bending the coil ends 4*d* by using the twisting and bending device 10.

First, the stator core 2 having the legs 4*a* of the coil segments 4 inserted in the slots 2*a* is set on the stator core holder 21.

Then, the stator core holder 21 is lifted by the lifting unit, and the distal end portions 4*e* of each of the coil segments 4 are inserted into the holders 15*a* and 16*a* of the holding jigs 15 and 16, respectively. Thus, the distal end portions 4*e* of the coil segments 4 are retained by the holders 15*a* and 16*a*. The lengths of the distal end portions 4*e* inserted into the holders 15*a* and 16*a* are all the same throughout the layers.

Next, the inner rotator 12 and the outer rotator 13 are simultaneously rotated by the rotational driver 14 in the circumferential directions that are opposite from each other. In this case, the inner rotator 12 is rotated clockwise, while the outer rotator 13 is rotated counterclockwise. Alternatively, the inner rotator 12 and the outer rotator 13 may be sequentially rotated.

As the outer rotator 13 rotates counterclockwise, the four holding jigs 15-1 to 15-4 for the odd-numbered layers rotate counterclockwise by the same angle, and at the same time, the holding jigs 15-1 to 15-4 move in the axial direction (downward) along the profiles of the through holes 15*b*. Thus, the coil ends 4*d* retained by the holders 15*a* of the holding jigs 15-1 to 15-4 are turned downward while being bent counterclockwise along the profiles of the through holes 15*b*.

Further, as the inner rotator 12 rotates clockwise, the four even-numbered layer holding jigs 16-1 to 16-4 rotate clockwise by the same angle, and at the same time, the holding jigs 16-1 to 16-4 move in the axial direction (downward) along the profiles of the through holes 16*b*. Thus, the coil ends 4*d* retained by the holders 16*a* of the holding jigs 16-1 to 16-4 are turned downward while being bent clockwise along the profiles of the through holes 16*b*.

As described above, the through holes 15*b* and 16*b* having different shapes are formed in the outer peripheral surfaces of the holding jigs 15 and 16, and the fixing rods 19 are inserted in the through holes 15*b* and 16*b*. With this arrangement, when the rotators 12 and 13 are rotated by the rotational driver 14, the holding jigs 15 and 16 rotate in the circumferential direction and also move downward along the profiles of the through holes 15*b* and 16*b*, respectively.

Hence, by rotating the holding jigs 15 and 16 by the rotational driver 14 through the intermediary of the rotators 12 and 13, the coil ends 4d positioned in outer layers are twisted and bent at the distal end portions 4e thereof, which are pulled by the holding jigs 15 and 16, and the neutral lines C1 of the twisting and bending are positioned on the inner side relative to the central lines C2 in the width direction of the coil ends 4d. Meanwhile, the coil ends 4d positioned in inner layers are twisted and bent at the distal end portions 4e thereof, which are compressed by the holding jigs 15 and 16, and the neutral lines C1 of the twisting and bending are positioned on the outer side relative to the central lines C2 in the width direction of the coil ends 4d.

Thus, the projecting heights of the distal end portions 4e of the coil ends 4d of each of the layers after the twisting and bending will be the same.

When the holding jigs 15 and 16 rotate, inner wall surfaces 33 of the holders 15a and 16a on the advancing direction side indicated by the arrow are subjected to a reaction force, as illustrated in FIG. 6. The moment of the reaction force acting on a support point A of the coil segment 4 increases as the distance from the support point A increases, so that the tapered portion 31 at the inlet causes little influence on the decrease of the reaction force.

Meanwhile, the inlet of the holders 15a and 16a on the opposite side from the advancing direction side has the vertical surface 32, so that the bases of the distal end portions 4e of the coil ends 4d can be used as the start points of the twisting and bending. Further, the cross sections of the middle portions of the holders 15a and 16a are substantially the same as the cross sections of the distal end portions 4e and the middle portions have a certain length, so that the distal end portions 4e will not be skewed in the holders 15a and 16a, thus allowing the distal end portions 4e to be straight.

The above has described the embodiment of the present invention; however, the present invention is not limited thereto. For example, although the description has been given of the case where the coil segments 4 of the odd-numbered layers and the coil segments 4 of the even-numbered layers are simultaneously twisted and bent, the present invention is not limited thereto. As described in, for example, the foregoing Patent Document 1, the coil segments 4 of each layer may be independently twisted and bent.

Further, the description has been given of the case where the coil segments 4 are twisted and bent while applying a tensile force or a compression force to the distal end portions 4e of the coil ends 4d according to the profiles of the through holes 15b and 16b; however, the present invention is not limited thereto. A mechanism that applies a tensile force or a compression force to the distal end portions 4e of the coil ends 4d may be separately provided.

DESCRIPTION OF REFERENCE NUMERALS

1 ... stator, 2 ... stator core, 2a ... slot, 2b ... slit, 3 ... coil, 4 ... coil segment (conductor), 4a ... leg, 4b ... head, 4d ... projecting portion, coil end, 4e ... distal end portion (end portion), 10 ... twisting and bending device, 11 ... support member, 12 ... rotator, inner rotator, 13 ... rotator, outer rotator, 14 ... rotational driver, 15,15-1~15-4 ... holding jig, odd-numbered layer holding jig, 16,16-1~16-4 ... holding jig, even-numbered layer holding jig, 15a, 16a ... holder, 15b, 16b ... through hole, 17 ... connecting rod, odd-numbered connecting rod, 18 ... connecting rod, even-numbered connecting rod, 19 ... fixing rod, 21 ... stator, core holder, 22 ... guide, 31 ... tapered portion, 32 ... vertical surface, 33 ... inner wall surface.

What is claimed is:

1. A manufacturing method of a rotating electric machine, comprising:
a step of holding end portions of each of a plurality of conductors, which are projected from slots of a stator core of the rotating electric machine and which are arranged in a radial direction of the stator core to form a plurality of layers, and twisting and bending the conductors while moving the end portions in a circumferential direction,
wherein positions of neutral lines for bending and central lines in a width direction of the conductors are differed by tensile bending conductors of the plurality of conductors that form outer side layers of the plurality of layers in the radial direction and compressive bending conductors of the plurality of conductors that form inner side layers of the plurality of layers in the radial direction, and
wherein the end portions of the conductors of each of the layers have same projecting heights before and after the twisting and bending.

2. The manufacturing method of a rotating electric machine according to claim 1, wherein positions of the neutral lines for bending with respect to the central lines in the width direction of the conductors are different for each layer.

3. The manufacturing method of a rotating electric machine according to claim 2, wherein the neutral lines for the bending are positioned on farther outer sides with respect to the central lines in the width direction for the conductors of the outer side layers.

4. The manufacturing method of a rotating electric machine according to claim 1, wherein a tensile force or a compression force applied when twisting and bending is different for each of the plurality of layers of the conductors.

* * * * *